Nov. 24, 1931.  W. H. FRENCH  1,833,110
AIRCRAFT PROPULSION
Filed Sept. 24, 1930   2 Sheets-Sheet 1
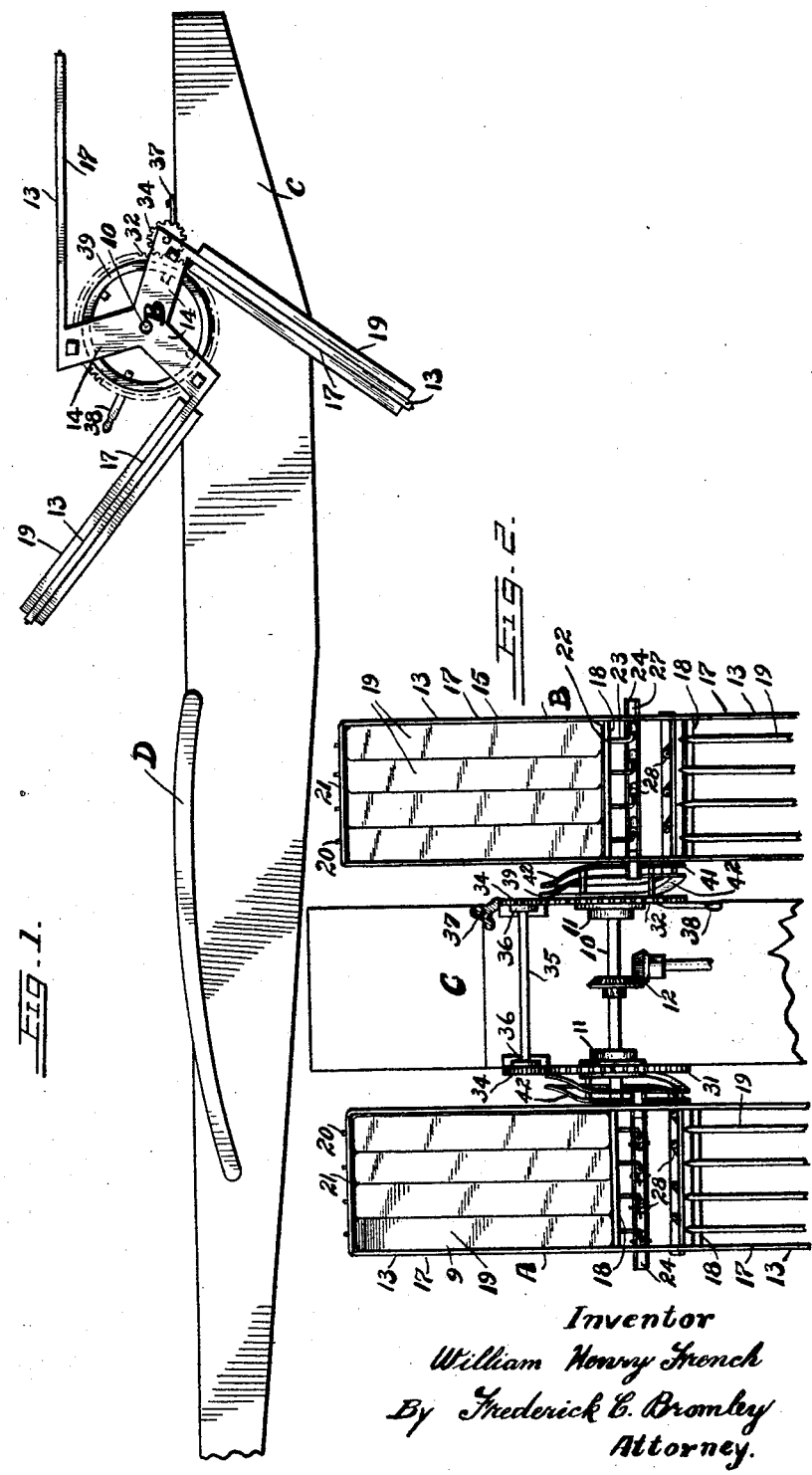

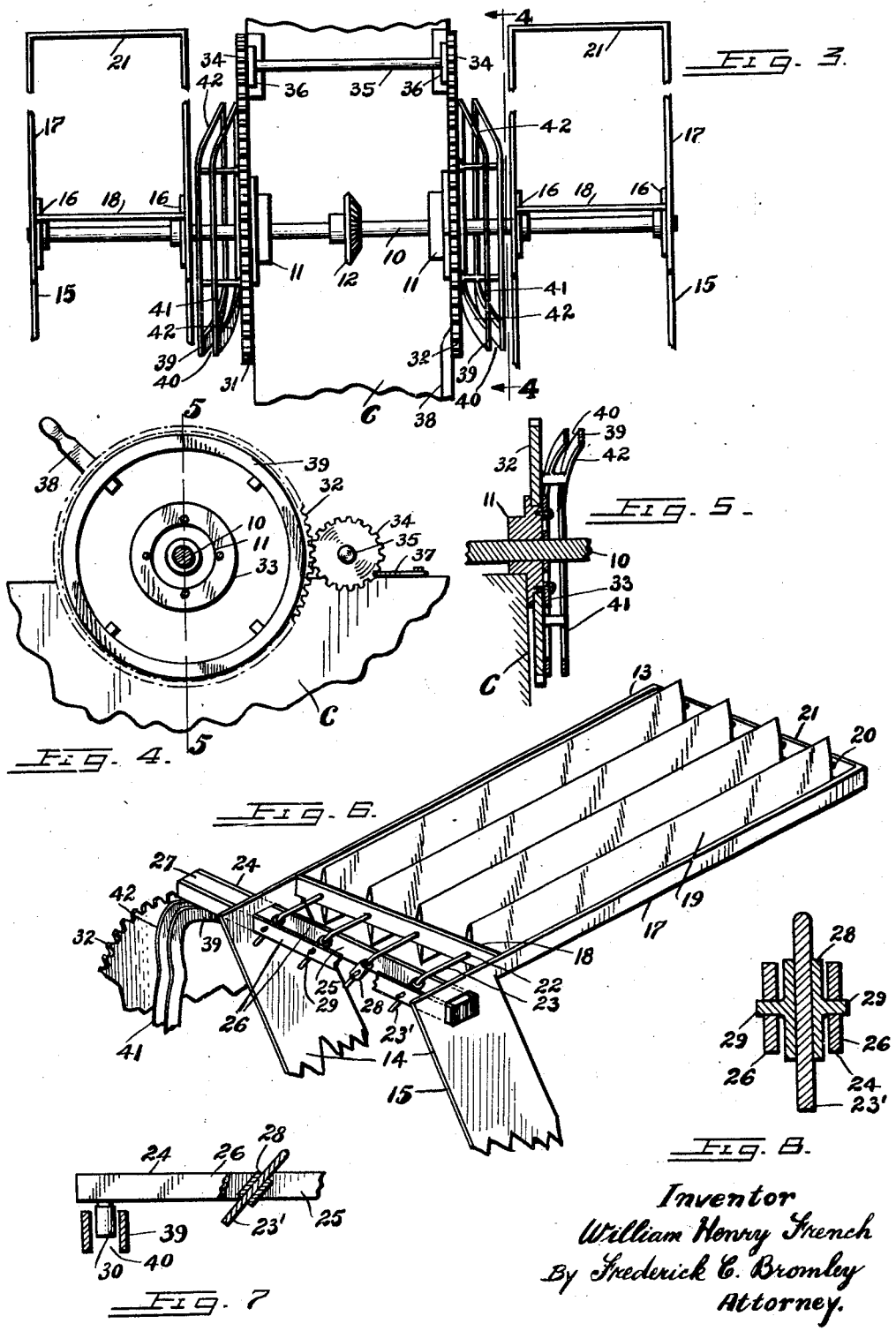

Patented Nov. 24, 1931

1,833,110

UNITED STATES PATENT OFFICE

WILLIAM HENRY FRENCH, OF TORONTO, ONTARIO, CANADA

AIRCRAFT PROPULSION

Application filed September 24, 1930. Serial No. 484,065.

The invention relates to improvements in air-craft propulsion as described in the present specification and shown in the accompanying drawings which form part of the same.

The invention appertains to propelling means for air-craft in general, although it is particularly designed for heavier-than-air machines. Its object is to produce a highly efficient impeller of the fan wheel type, one that will possess great lifting power per horse power of the prime mover.

A salient advantage of the invention is that it will not only shorten the initial ascent of an aeroplane but also decrease the landing space required. Furthermore, owing to the particular design of its vanes the pressure angle of the thrust may be manually varied by the pilot in accordance with flight conditions.

The invention consists essentially of an impeller composed of vanes automatically opened and closed as they turn, so that a pressure surface is presented only during each working angle of each convolution. Mechanism is furnished whereby the occurrence of the working angle may be manually changed.

Referring to the drawings: Figure 1 is a side elevation of an aeroplane embodying the present invention. Figure 2 is a plan view thereof depicting the forward end in order to show the impellers, which are partly broken away. Figure 3 is a plan view of the invention showing the vane blades omitted and also certain other parts with a view to more clearly depicting the framework of the impellers and the cams. Figure 4 is a cross-section taken on the line 4—4 of Figure 3. Figure 5 is a vertical section taken on the line 5—5 of Figure 4. Figure 6 is a perspective view of one of the vanes of an impeller together with a fragmentary view of a cam for actuating its blades. Figure 7 is a detail depicting a part of the follower rod of a vane. Figure 8 is a detail of one of the rockers borne by the follower rod.

Like numerals of reference indicate corresponding parts in each of the figures throughout the drawings.

The embodiment of the invention illustrated in the drawings by way of exemplification comprises a pair of impellers A and B straddling a fuselage C, which fuselage may be of any desirable construction. The sustaining surfaces may be arranged in any desirable manner and may take the form of wings or planes as illustrated by way of example at D. The impellers while shown in the vicinity of the front of the fuselage may be otherwise disposed if so desired.

10 is a transverse shaft journalled in bearings 11, one at each side of the fuselage C. 12 designates a set of gearing for connection to a prime mover for the purpose of driving the shaft, which prime mover is not shown as it does not form a part of the present invention.

The shaft projects from each side of the fuselage and carries the impellers A and B which are rigidly affixed thereto. These impellers are composed of vanes 13 of identical construction; hence a description of one will suffice. 14 denotes a pair of spaced arms radially projecting from the shaft 10 and forming a part of a spider 15, which arms may each radiate from a hub 16 affixed to the shaft in well known manner. Forwardly projecting from the arms at an acute angle is a blade frame 17 preferably of a U-shape as shown. This frame has a crossbar 18 disposed in the vicinity of the arms 14.

19 denotes the blades which extend longitudinally of the frame 17 and are journalled at their forward ends as at 20 in the crosspiece 21 of the frame, while their rearward ends are likewise journalled in the crossbar 18 as at 22. Each blade has a rod 23 projecting from its journalled end 22 and bent at right angles to its length in the form of an arm 23'. The blades are so proportioned that when they lie substantially flat with one another their edges slightly overlap each other in order to compose a solid vane surface but when the blades are turned through an angle of 90° so as to lie in a parallel plane as shown in Figure 6 the vane surface is destroyed and a minimum of resistance presented by the compression side of each vane.

Extending transversely thru the arms 14 is a follower rod 24 slidably mounted in suitable bearings formed therein and having a slot 25 extending practically its entire length. This slot is composed by bars 26 spaced by blocks 27.

Within the slot 25 are rockers 28 corresponding in number to the blades 19 and journalled by means of trunnions 29 in the bars 26. Each rocker is bored to slidably receive an arm 23′ of one of the blades so as to both provide a swivel and a slidable action. The inner end of the follower rod has a follower 30 preferably equipped with a roller, see particularly Figure 7.

From the preceding description it will be manifest that when the follower rod is shifted in one direction the rockers 28 will turn the shafts 23 and thus close the blades, whereas when the follower rod is shifted in the opposite direction the blades will be open.

Having described the vanes, the mechanism for automatically actuating them will be now recounted. 31 and 32 is a pair of gears journalled on the bearings 11 independently of the shaft 10 and detachable from said bearings through the provision of retaining rings 33. These gears are connected together in some manner in order that they may move in unison. The mechanism shown in the drawings to accomplish this end is given by way of example but not of limitation. It consists of a pair of pinions 34 in mesh with said gears and rigidly mounted upon a shaft 35 suitably journalled in bearings 36. According to this construction, when one of the gears is turned the pinions 34 will transmit the motion to the other gear so as to cause them to move in the same direction at the same time. It is proposed to provide some form of lock in order that the gears may not inadvertently turn and to this end a pawl 37 may be employed so as to engage the tooth of one of the pinions 34. It is manifest, however, that the various means may be substituted for the pawl. To manually turn the gears a lever 38 may be affixed to one of them. Rigidly affixed to the outer face of each gear is a barrel cam 39 having an annular groove 40 in which is fitted the follower 30 of one of the follower rods 24. Each cam has a pair of straight sections as at 41 and a pair of opposed throw sections 42. According to this construction it will be apparent that as the impellers are turned by the shaft 10 the follower rods 24 will be carried around the stationary cams 39 and the followers 30 will ride in the grooves 40. In each convolution while the follower of each vane is passing through one of the straight sections 41 no motion will be imparted to its follower rod 24; however upon arriving at one of the throw sections 42 the cam will impart a longitudinal movement to the follower rod of each vane in order to cause it to turn the blades in one direction; for example to close them. Continuation of the turning movement will cause the follower to ride in the other straight section of the cam until it arrives at the opposite throw section, whereupon it will be shifted in order to move the follower rod in the opposite direction so as to open the blades. In this manner the blades of each vane will be automatically opened and closed during each convolution of the respective impellers and will thus have a working angle corresponding to the period the vanes remain closed.

The occurrence of the working angle may be varied by manually turning the gears 31, 32, by means of the lever 38: this changes the position of each cam 39. By shifting the cams in a rearward direction the occurrence of the working angle will be retarded, that is to say it will occur slightly earlier in each revolution of the impellers and thus have a tendency to cause banking of the aeroplane; whereas the movement of the cams in a forward direction would cause an opposite action. This will be manifest from an inspection of the drawings.

Whereas the invention has been shown and described by way of example in one of its embodiments it is manifest to those skilled in the art that various changes may be resorted to both in the construction and arrangement of the impellers and their mechanism and also in their number and location in respect to the fuselage; hence it is not the intention to limit the invention in this respect.

What I claim is:—

In an air-craft propulsion apparatus, the combination with a series of blades journalled in a framework, of a follower rod slidable endwise in said framework and lengthwise slotted, bored rockers longitudinally arranged in the slot of the follower rod, trunnions mounting the rockers in the follower rod, and arms radiating from the axes of the blades and slidably disposed in the bores of the rockers.

Signed at Toronto, Ontario, the 13th day of September, 1930.

WILLIAM HENRY FRENCH.